US012619013B2

(12) United States Patent
Hachisuga

(10) Patent No.: US 12,619,013 B2
(45) Date of Patent: May 5, 2026

(54) OPTICAL DEVICE AND IMAGE READING DEVICE WITH A PLURALITY OF LENSES AND LIGHT-BLOCKING BODY

(71) Applicant: FUJIFILM Business Innovation Corp., Tokyo (JP)

(72) Inventor: Masaki Hachisuga, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/155,266

(22) Filed: Jan. 17, 2023

(65) Prior Publication Data

US 2024/0085596 A1 Mar. 14, 2024

(30) Foreign Application Priority Data

Sep. 9, 2022 (JP) ................................. 2022-143480

(51) Int. Cl.
*G02B 5/00* (2006.01)
*G02B 3/00* (2006.01)
*H04N 1/028* (2006.01)
*H04N 1/03* (2006.01)

(52) U.S. Cl.
CPC .......... *G02B 5/005* (2013.01); *G02B 3/0068* (2013.01); *H04N 1/02895* (2013.01); *H04N 1/0306* (2013.01); *H04N 2201/0081* (2013.01)

(58) Field of Classification Search
None
See application file for complete search history.

(56) References Cited

U.S. PATENT DOCUMENTS

2023/0412748 A1* 12/2023 Matsui ................... G02B 3/005

FOREIGN PATENT DOCUMENTS

JP 2003-302504 A 10/2003

* cited by examiner

*Primary Examiner* — Lennin R Rodriguezgonzalez
(74) *Attorney, Agent, or Firm* — Oliff PLC

(57) ABSTRACT

An optical device includes: a lens body including plural lenses arranged such that optical axes of the plural lenses extend along each other; and a light-blocking body disposed on a light incident side of the lens body and including light-transmitting portions that transmit light and light-blocking portions that block light, the light-transmitting portions and the light-blocking portions being continuously arranged in an alternating manner such that the light-transmitting portions are positioned at the plural lenses and that the light-blocking portions are positioned between the plural lenses.

6 Claims, 11 Drawing Sheets

OPTICAL DEVICE AND IMAGE READING DEVICE WITH A PLURALITY OF LENSES AND LIGHT-BLOCKING BODY

CROSS-REFERENCE TO RELATED APPLICATIONS

This application is based on and claims priority under 35 USC 119 from Japanese Patent Application No. 2022-143480 filed Sep. 9, 2022.

BACKGROUND

(i) Technical Field

The present disclosure relates to an optical device and an image reading device.

(ii) Related Art

Japanese Unexamined Patent Application Publication No. 2003-302504, for example, describes an optical device including a lens array unit including at least one lens array and a first light-blocking mask, the lens array including plural lenses that are arranged in rows and having plural first lens surfaces through which light is incident and plural second lens surfaces through which light is emitted, the first light-blocking mask having plural through holes that extend therethrough in an axial length direction of each lens and covering a front surface of the lens array such that the through holes are positioned in front of respective ones of the first lens surfaces. The lens array unit also includes a second light-blocking mask having plural through holes that extend therethrough in the axial length direction of each lens and being disposed behind the lens array such that the through holes are positioned behind respective ones of the second lens surfaces.

SUMMARY

The lens performance of a lens body including plural lenses arranged such that optical axes thereof extend along each other may be improved by reducing intervals between the lenses. However, in such a case, the occurrence of molding failure in a resin molding process increases due to reduction in the thickness of a light-blocking body, and the manufacturing cost cannot be easily reduced.

Aspects of non-limiting embodiments of the present disclosure relate to reduction of influence on lens performance compared to that in a device including a lens body and a light-blocking body formed by resin molding.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an optical device including: a lens body including plural lenses arranged such that optical axes of the plural lenses extend along each other; and a light-blocking body disposed on a light incident side of the lens body and including light-transmitting portions that transmit light and light-blocking portions that block light, the light-transmitting portions and the light-blocking portions being continuously arranged in an alternating manner such that the light-transmitting portions are positioned at the plural lenses and that the light-blocking portions are positioned between the plural lenses.

BRIEF DESCRIPTION OF THE DRAWINGS

Exemplary embodiments of the present disclosure will be described in detail based on the following figures, wherein:

FIGS. 10A and 10B illustrate a light-blocking wall according to a third exemplary embodiment, wherein FIG. 10A illustrates the shape of a light-transmitting portion and light-blocking portions of the light-blocking wall and FIG. 10B illustrates the relative positional relationship between the light-blocking wall and a microlens array; and FIGS. 11A and 11B illustrate a light-blocking wall according to a fourth exemplary embodiment, wherein FIG. 11A illustrates the shape of a light-transmitting portion and light-blocking portions of the light-blocking wall and FIG. 11B illustrates the relative positional relationship between the light-blocking wall and a microlens array.

DETAILED DESCRIPTION

Figure 1:
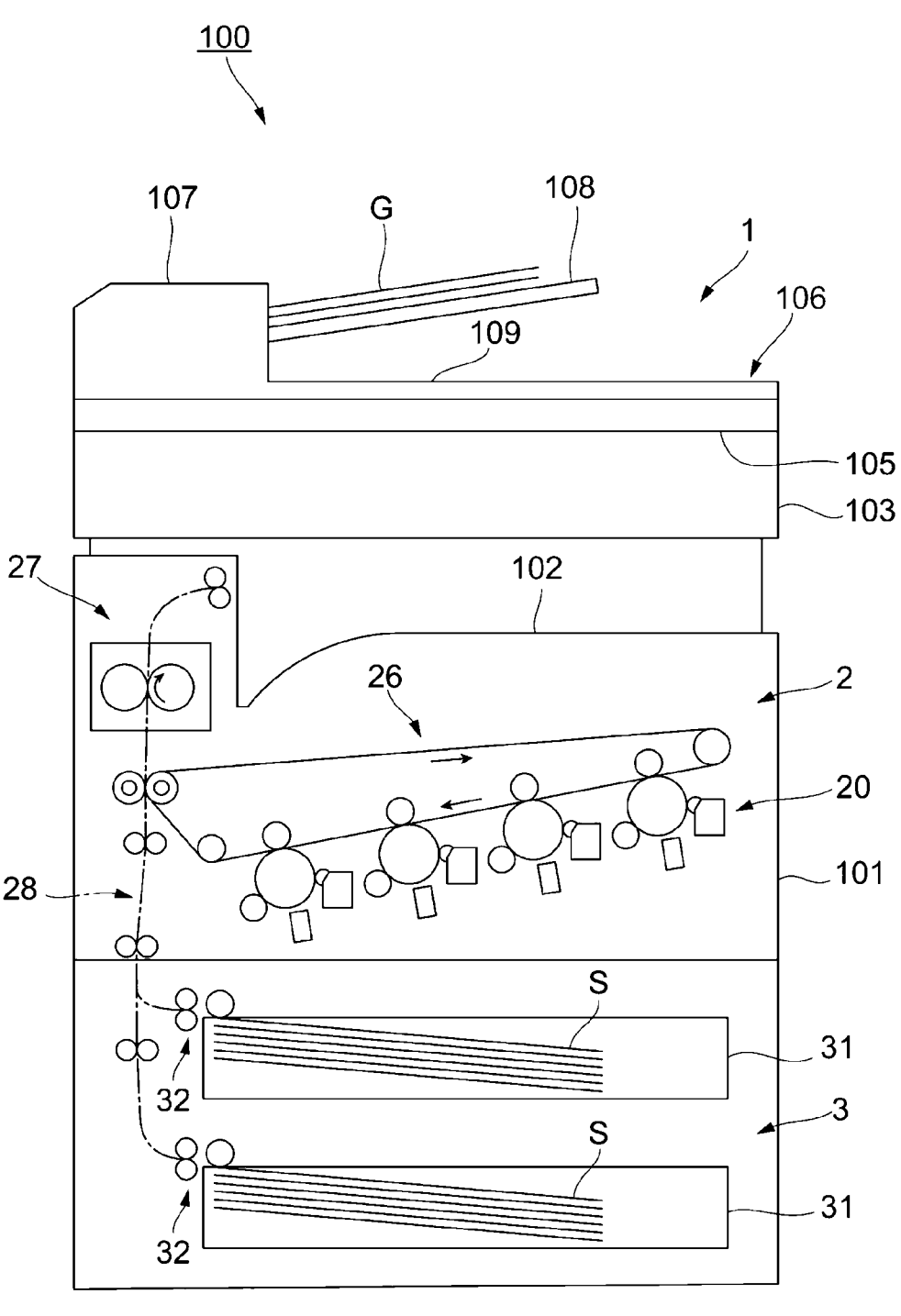
FIG. 1 schematically illustrates an image forming apparatus to which an exemplary embodiment is applied.

Exemplary embodiments of the present disclosure will now be described in detail with reference to the accompanying drawings. The size, thickness, etc., of each component illustrated in the drawings referred to in the following description may differ from the actual dimensions.

Image Forming Apparatus 100

FIG. 1 schematically illustrates an image forming apparatus 100 to which an exemplary embodiment is applied.

As illustrated in FIG. 1, the image forming apparatus 100 includes a document reading device 1 that reads information on a document G; an image forming section 2 that forms an image on a recording sheet S based on the information of the document read by the document reading device 1 (read image); and a sheet feeding unit 3 that feeds the recording sheet S to be supplied to the image forming section 2. The image forming apparatus 100 includes an apparatus body 101 in which the image forming section 2 and the sheet feeding unit 3 are disposed, and the document reading device 1 is disposed above the apparatus body 101. The apparatus body 101 includes an output receiving unit 102 on an upper surface thereof, and the recording sheet S having the image formed thereon is output to and received by the output receiving unit 102.

The document reading device 1 includes a housing 103. The document reading device 1 includes a document table 105 on which a document G is placed and that transmits light on an upper surface of the housing 103, and also includes a document cover 106 that covers the document table 105 and that is capable of being opened and closed with respect to the housing 103. The document cover 106 includes an automatic document transport unit 107 that transports the document G to a reading position and outputs the document G after the document G is read; a document tray 108 on which the document G to be fed by the automatic document transport unit 107 is placed; and a receiving unit 109 that receives the document G output by the automatic document transport unit 107.

The image forming section 2 includes, for example, an image forming unit 20 that forms toner images of respective colors, which are yellow (Y), magenta (M), cyan (C), and black (K) with an electrophotographic system; an intermediate transfer unit 26 that transports the toner images formed by the image forming unit 20 until the toner images are transferred to the recording sheet S; and a fixing unit 27 that fixes the toner images transferred from the intermediate transfer unit 26 to the recording sheet S. The image forming section 2 may form images with, for example, an inkjet system instead of the electrophotographic system.

The sheet feeding unit 3 includes drawer-type containers 31 capable of containing plural recording sheets S having a predetermined size or of a predetermined type, for example; and feeding devices 32 that feed the recording sheets S contained in the containers 31 one at a time. A supply transport path 28 along which each recording sheet S fed from the sheet feeding unit 3 is transported to a second transfer position is disposed between the sheet feeding unit 3 and the image forming section 2.

A basic operation of the image forming apparatus 100 will now be described.

First, a user places the document G on the document table 105 or the document tray 108 of the document reading device 1. Then, when the user operates an operation button (not illustrated), for example, the document reading device 1 receives a document read command and starts an operation of reading the document G. Thus, the document reading device 1 acquires information by reading the document G. Then, the image forming section 2 executes an image forming operation based on the information acquired by reading the document G and received from the document reading device 1. The sheet feeding unit 3 feeds the recording sheet S in accordance with the operation of the image forming section 2. The recording sheet S is output to the output receiving unit 102 after the toner images are fixed thereto in the image forming section 2. The above-described image forming operation is repeated a number of times corresponding to the number of sheets of the document G and the number of sheets on which an image is to be formed. Document Reading Device 1

The document reading device 1 to which the exemplary embodiment is applied will be described with reference to FIG. 2. The document reading device 1 is an example of an optical device.

Figure 2:
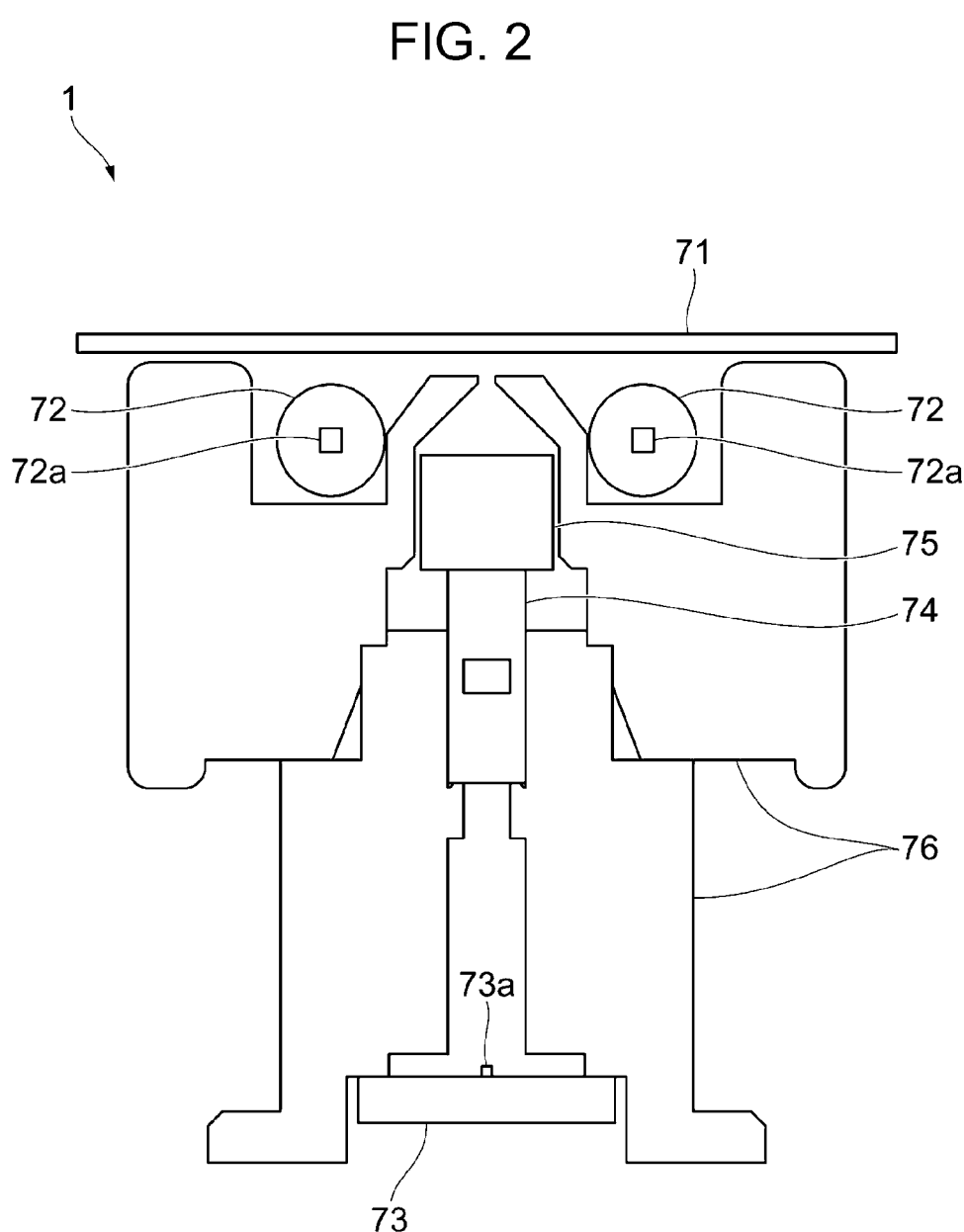
FIG. 2 schematically illustrates an image reading device to which the exemplary embodiment is applied.

FIG. 2 schematically illustrates the document reading device 1 to which the exemplary embodiment is applied, wherein the direction orthogonal to the plane of FIG. 2 is a main scanning direction.

As illustrated in FIG. 2, the document reading device 1 includes a transparent plate 71 having an upper surface that supports a document (not illustrated) to be read; light guides 72 that guide light from light sources 72a toward the document; and a light-receiving substrate 73 having light-receiving elements 73a that receive light reflected by the document.

The light sources 72a and the light guides 72 are arranged so that the document receives light from one direction and also receives light from another direction.

The light-receiving substrate 73 is positioned further away from the transparent plate 71 than the light guides 72. The light-receiving elements 73a provided on the light-receiving substrate 73 are arranged in a row with intervals therebetween in the main scanning direction.

The document reading device 1 also includes a microlens array 74 including plural small microlenses, and a light-blocking wall 75 for blocking reflected light traveling toward microlenses other than the intended ones.

The microlens array 74 is disposed to extend in the main scanning direction.

The light-blocking wall 75, which extends in the main scanning direction, is positioned on a side of the microlens array 74 from which light enters, and blocks the light to limit the light that enters each of the microlenses of the microlens array 74.

The document reading device 1 also includes a housing 76 that holds the light guides 72, the light-receiving substrate 73, the microlens array 74, and the light-blocking wall 75. The housing 76 positions the light-receiving substrate 73, the microlens array 74, and the light-blocking wall 75 with respect to the transparent plate 71.

Figure 3:
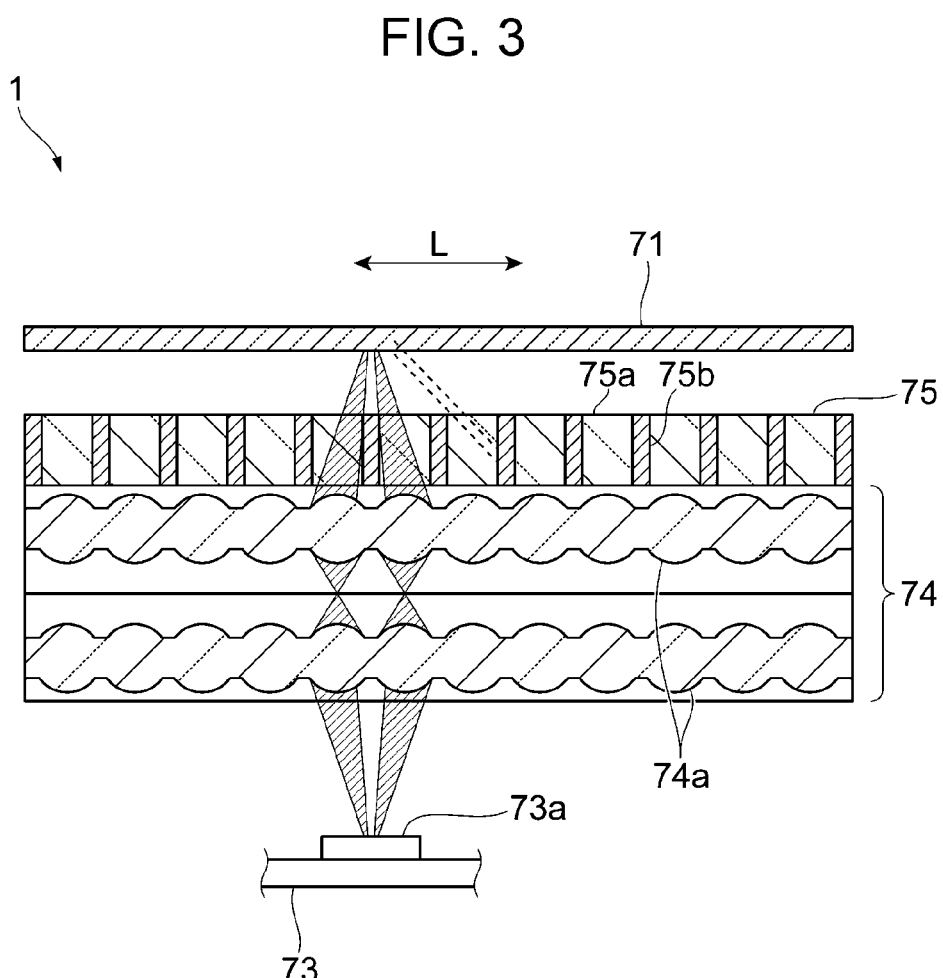
FIG. 3 illustrates a manner in which light reflected by a document placed on a transparent plate is received by light-receiving elements on a light-receiving substrate.

FIG. 3 illustrates a manner in which the light reflected by the document on the transparent plate 71 is received by the light-receiving elements 73a on the light-receiving substrate 73. FIG. 3 is a sectional view of FIG. 2 taken along a plane perpendicular to the plane of FIG. 2, and the main scanning direction L is shown in FIG. 3.

As illustrated in FIG. 3, the light-blocking wall 75 includes light-transmitting portions 75a that transmit light and light-blocking portions 75b that block light, the light-transmitting portions 75a and the light-blocking portions 75b being continuously arranged in an alternating manner. The light-transmitting portions 75a are made of, for example, a material such as glass or a transparent resin. The light-blocking portions 75b are made of, example, a light-blocking film or black adhesive.

The light-blocking wall 75 is disposed between the transparent plate 71 and the microlens array 74 due to a long focal depth.

The microlens array 74 may be an erect equal-magnification imaging two-lens array with small magnification variations due to misalignment. The microlens array 74 includes microlenses 74a arranged in the main scanning direction so that optical axes of the microlenses 74a extend along each other.

According to the above-described configuration, portions of the light reflected by the document on the transparent plate 71 that pass through the light-transmitting portions 75a of the light-blocking wall 75 are transmitted through the microlens array 74 and received by the light-receiving elements 73a.

According to the above-described light-blocking wall 75, the angular aperture may be reduced, and oblique incidence of light may be limited to prevent entrance of stray light (shown by dashed lines) into neighboring microlenses, so that the performance of the microlenses may be improved.

The microlens array 74 is an example of a lens body, and the microlenses 74a are examples of plural lenses. The light-blocking wall 75 is an example of a light-blocking body.

First Exemplary Embodiment

FIGS. 4A to 4E illustrate sequential steps for manufacturing the light-blocking wall 75 according to a first exemplary embodiment.

Figure 4:
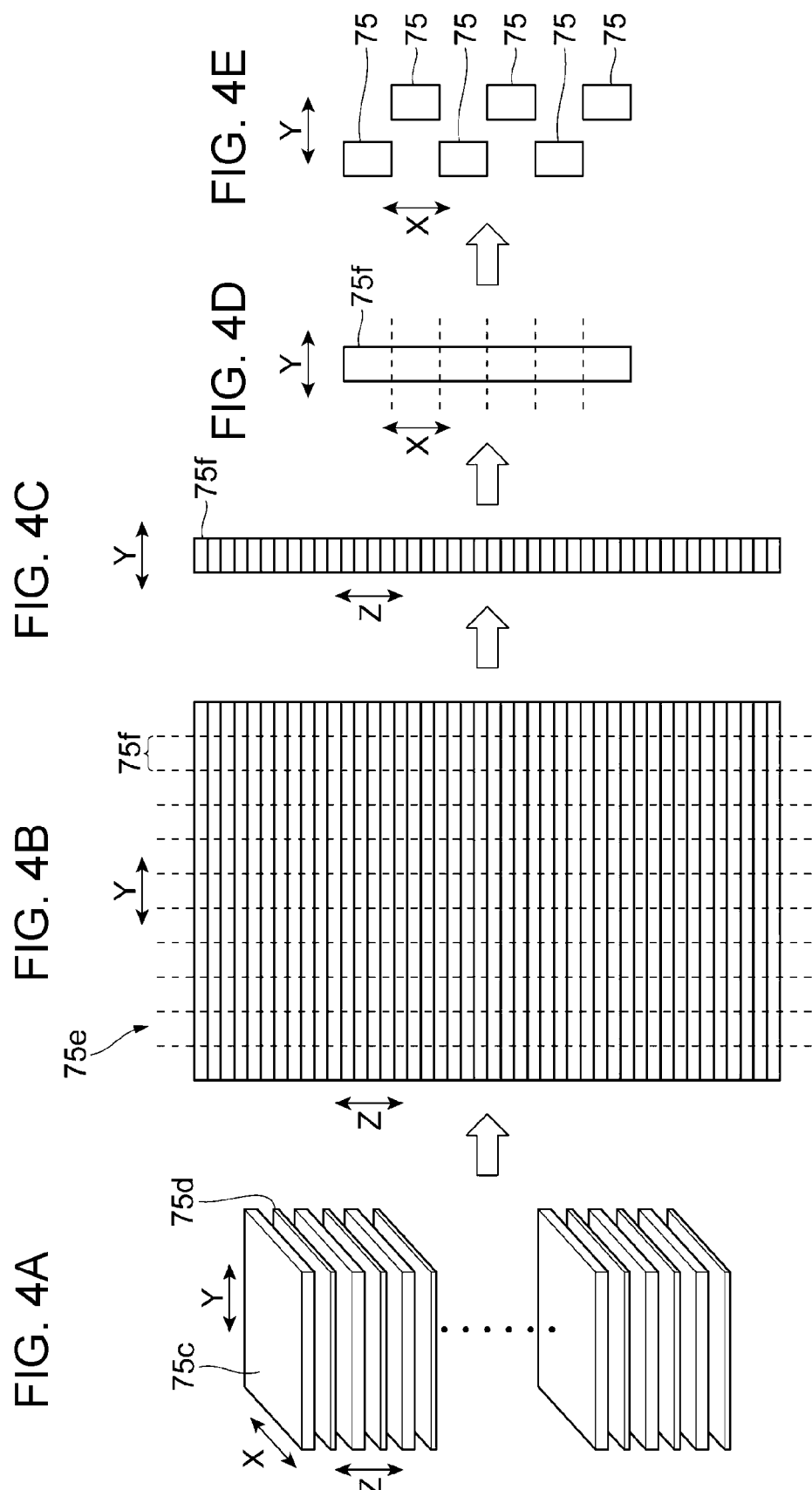
FIGS. 4A to 4E illustrate sequential steps for manufacturing a light-blocking wall according to a first exemplary embodiment.

As illustrated in FIG. 4A, first members 75c composed of, for example, glass or transparent members and second members 75d composed of, for example, light-blocking films or black adhesive are stacked and integrated together. More specifically, the first members 75c from which the light-transmitting portions 75a (see FIG. 3) are formed and the second members 75d from which the light-blocking portions 75b (see FIG. 3) are formed are stacked and bonded together to form a block member 75e. Thus, the light-blocking wall 75 is not produced by resin molding by using a mold.

The first members 75c and the second members 75d may have uniform thicknesses.

In the example illustrated in FIG. 4A, the first members 75c and the second members 75d are plate-shaped members having certain thicknesses, and are stacked one by one in an alternating manner. Although one second member 75d is disposed between adjacent ones of the first members 75c, the arrangement is not limited to this, and plural second members 75d may be disposed between adjacent ones of the first members 75c. Such an arrangement is effective when the thickness of the second members 75d is not enough to form each light-blocking portion 75b of a sufficient thickness from one second member 75d.

When the second members 75d are composed of black adhesive or the like and are not plate-shaped members having a thicknesses, the thickness of the light-blocking portions 75b may be set by adjusting the amount of the adhesive.

As illustrated in FIG. 4A, the directions in which one side and another side of each of the first members 75c and the second members 75d extend are defined as an X direction and a Y direction, and the direction in which the first members 75c and the second members 75d are stacked is defined as a Z direction. The block member 75e illustrated in FIG. 4B is cut along cutting plane lines (shown by dashed lines in FIG. 4B) that extend parallel to the Z direction. The cutting plane lines are lines on a plane defined by the Y and Z directions.

Thus, as illustrated in FIG. 4C, a plate-shaped multilayer member 75f having a predetermined width (dimension in the Y direction) is formed. The plate-shaped multilayer member 75f is configured such that the light-transmitting portions 75a (see FIG. 3) formed from the first members 75c and the light-blocking portions 75b (see FIG. 3) formed from the second members 75d are continuously arranged in an alternating manner.

Since the plate-shaped multilayer member 75f illustrated in FIG. 4C is elongated in the Z direction, as illustrated in FIG. 4D, the plate-shaped multilayer member 75f is further cut along lines (shown by dashed lines) on a plane defined by the X and Y directions, so that the length thereof in the X direction is adjusted. Thus, as illustrated in FIG. 4E, light-blocking walls 75 that are narrow in the X and Y directions and elongated in the Z direction are formed.

Figure 5:
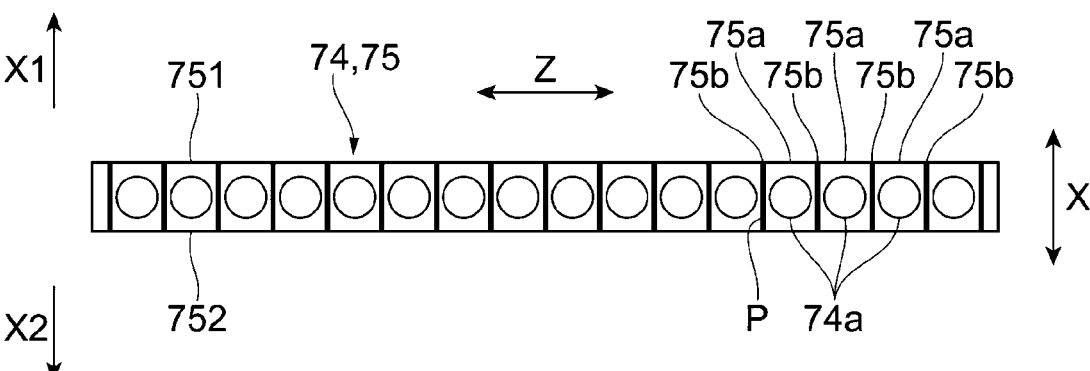
FIG. 5 illustrates the relative positional relationship between the light-blocking wall and a microlens array according to the first exemplary embodiment.

FIG. 5 illustrates the relative positional relationship between the light-blocking wall 75 and the microlens array

74 according to the first exemplary embodiment. FIG. 5 is a view from the side at which the light-blocking wall 75 is disposed, wherein the light-blocking wall 75 is closer to the viewer and the microlens array 74 is farther from the viewer. In FIG. 5, the Z direction is the main scanning direction.

As illustrated in FIG. 5, in the first exemplary embodiment, the microlenses 74a of the microlens array 74 are arranged in one row. The light-blocking wall 75 corresponding to the microlens array 74 includes the light-transmitting portions 75a and the light-blocking portions 75b that are continuously arranged in an alternating manner in the Z direction. In the first exemplary embodiment, the Z direction is an example of a direction in which the light-transmitting portions and the light-blocking portions are continuously arranged in the alternating manner.

More specifically, the light-blocking wall 75 is positioned with respect to the microlens array 74 so that the light-transmitting portions 75a are positioned at the positions of the microlenses 74a of the microlens array 74 and that the light-blocking portions 75b are positioned between the microlenses 74a. Therefore, the light reflected by the document passes through the light-transmitting portions 75a of the light-blocking wall 75, which are formed from the first members 75c (see FIG. 4A), and is incident on the microlenses 74a (see also FIG. 3).

In the first exemplary embodiment, the light-blocking portions 75b are not provided to cover the entire periphery of the microlenses 74a, and there is a direction in which the light-blocking portions 75b are not provided. Accordingly, there are a light-blocking direction in which light is blocked by the light-blocking portions 75b, and a light-unblocking direction in which light is not blocked.

The light-blocking direction, which means herein a direction in which the light-blocking portions 75b block light from entering the microlenses 74a, is the longitudinal direction of the light-blocking wall 75, that is, the Z direction in the first exemplary embodiment. The light-unblocking direction, which means herein a direction that crosses the light-blocking direction and in which the light-blocking portions 75b does not block light from entering the microlenses 74a, is the transverse direction of the light-blocking wall 75, that is, the X direction that is substantially orthogonal to the Z direction in the first exemplary embodiment.

As illustrated in FIG. 5, the light-blocking wall 75 has a first side surface 751 and a second side surface 752 that are flat surfaces extending in the Z and Y directions. The first side surface 751 is positioned at one side X1 in the X direction, which is the light-unblocking direction, and the second side surface 752 is positioned at the other side X2 in the X direction. The light-blocking portions 75b are formed to connect the first side surface 751 and the second side surface 752 to each other.

The X direction is the vertical direction in FIG. 5, and defines, for example, one direction that is an upward direction and the other direction that is a downward direction. The one direction (upward direction in FIG. 5) along the X direction points toward the one side X1, and the other direction (downward direction in FIG. 5) points toward the other side X2.

More specifically, the X direction is a direction other than the Z direction, which is the direction in which the light-transmitting portions 75a and the light-blocking portions 75b are continuously arranged in an alternating manner, and the Y direction, which is an optical axis direction in which optical axes of the microlenses 74a extend. The light-blocking portions 75b block light along planes defined by two directions, which are the X direction and the Y direction.

Therefore, the one side X1 and the other side X2 are sides in one and the other directions, respectively, along the direction that defines the planes along which light is blocked by the light-blocking portions 75*b* together with the optical axis direction.

Although FIG. 5 shows the Z direction and the X direction, the directions may instead be the Z direction and the Y direction, in which case the optical axis direction is the X direction.

In the first exemplary embodiment, the X direction, which is the light-unblocking direction defined by the light-blocking portions 75*b*, is substantially orthogonal to the Z direction, and therefore the position of each light-blocking portion 75*b* on the first side surface 751 at the one side X1 and the position of the light-blocking portion 75*b* on the second side surface 752 at the other side X2 are the same in the Z direction.

In addition, in the first exemplary embodiment, as described above, the light-blocking planes along which light is blocked by the light-blocking portions 75*b* are defined by two directions, which are the X direction and the Y direction. The light-blocking portions 75*b* have surfaces P extending in a direction substantially orthogonal to the Z direction, which is the direction in which the light-transmitting portions 75*a* and the light-blocking portions 75*b* are continuously arranged in an alternating manner, and the surfaces P extend along the light-blocking planes and prevent internal reflection within the light-blocking wall 75.

The surfaces P are surfaces of the light-blocking portions 75*b* that define the boundaries between the light-transmitting portions 75*a* that are adjacent to each other.

In the first exemplary embodiment, the Z direction is an example of a light-blocking direction, and the X direction is an example of a light-unblocking direction. The surfaces P are examples of extending surfaces.

Second Exemplary Embodiment

FIGS. 6A to 6E illustrate sequential steps for manufacturing a light-blocking wall 75 according to a second exemplary embodiment. Some of the manufacturing steps of the second exemplary embodiment are the same as those of the first exemplary embodiment, and description thereof may thus be omitted.

Figure 6:
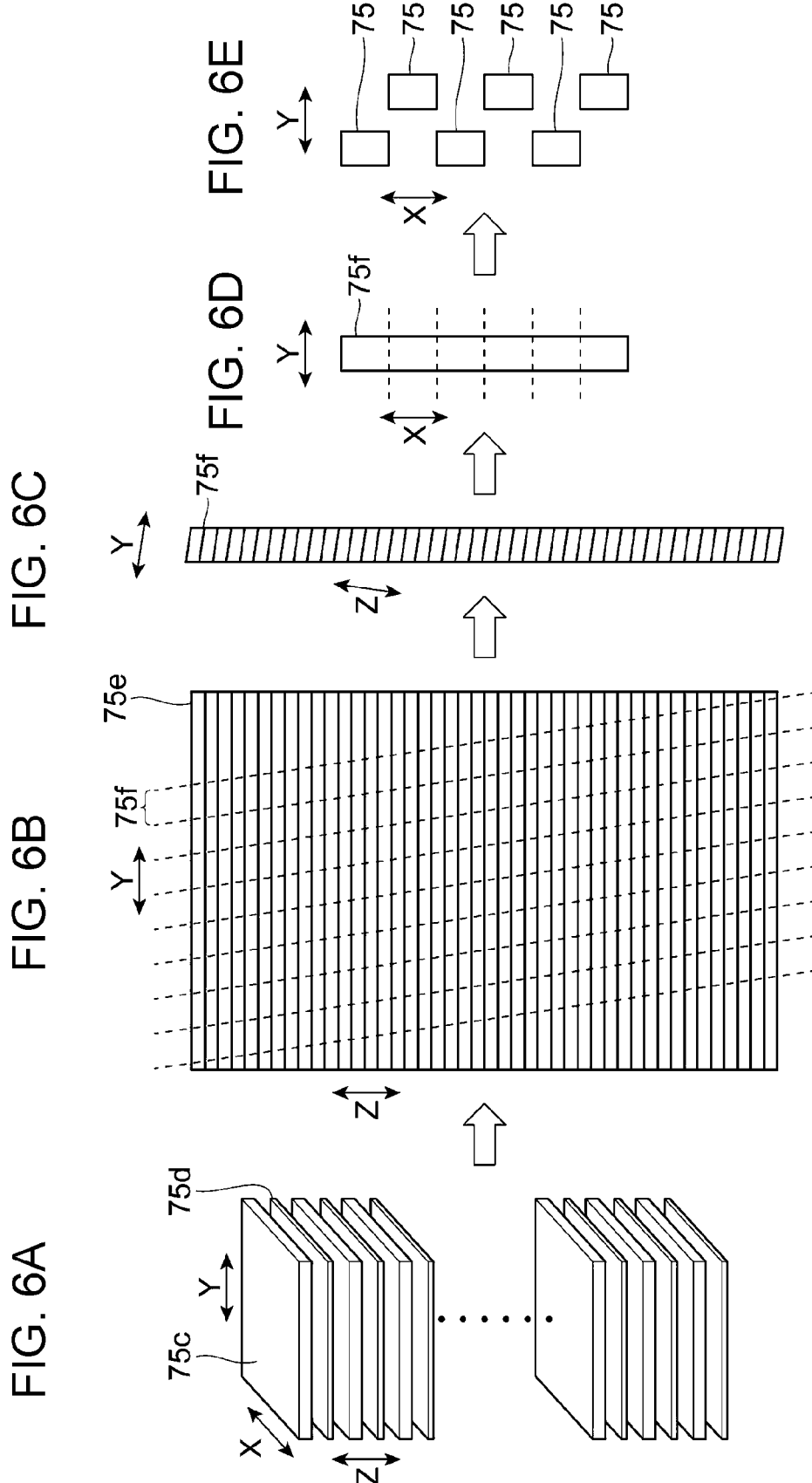
FIGS. 6A to 6E illustrate sequential steps for manufacturing a light-blocking wall according to a second exemplary embodiment.

First members 75*c* and Second members 75*d* are stacked together, as illustrated in FIG. 6A, to form a block member 75*e*, and the block member 75*e* is cut along cutting plane lines (shown by dashed lines) that extend obliquely in a direction that crosses the Z direction, as illustrated in FIG. 6B. The cutting plane lines according to the second exemplary embodiment extend obliquely with respect to the Z direction, and thus differ from the cutting plane lines according to the first exemplary embodiment that extend parallel to the Z direction.

Accordingly, as illustrated in FIG. 6C, the light-blocking portions 75*b* extend obliquely with respect to the surfaces of the multilayer member 75*f.*

Figure 7:
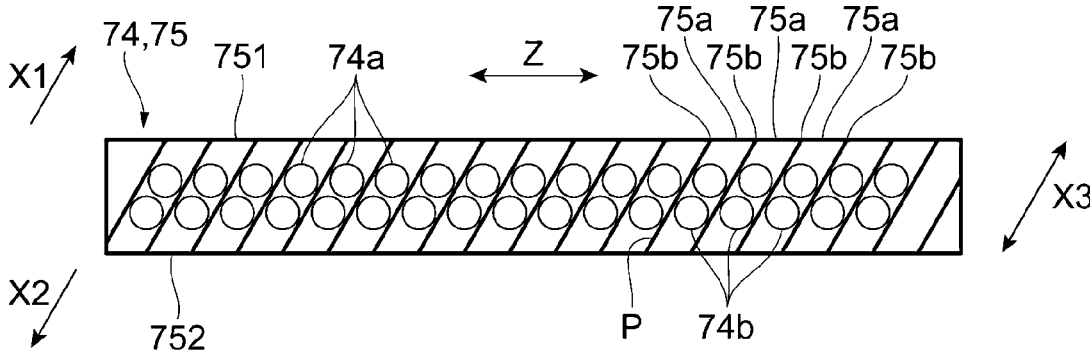
FIG. 7 illustrates the relative positional relationship between the light-blocking wall and a microlens array according to the second exemplary embodiment.

FIG. 7 illustrates the relative positional relationship between the light-blocking wall 75 and a microlens array 74 according to the second exemplary embodiment, and corresponds to FIG. 5 illustrating the first exemplary embodiment.

The microlens array 74 illustrated in FIG. 7 have a two-row microlens arrangement that differs from the one-row arrangement illustrated in FIG. 5. More specifically, the microlens array 74 according to the second exemplary embodiment includes microlenses 74*a* and microlenses 74*b* that are arranged in the Z direction. In the second exemplary embodiment, the Z direction is an example of a direction in which the light-transmitting portions and the light-blocking portions are continuously arranged in the alternating manner.

In the two-row arrangement according to the second exemplary embodiment, the row of the microlenses 74*a* and the row of the microlenses 74*b* are shifted from each other in the Z direction. The interval between the row of the microlenses 74*a* and the row of the microlenses 74*b* is less than that in the case where the rows are not shifted from each other in the Z direction.

The microlenses 74*a* and the microlenses 74*b* are at different positions in the Z direction, and the microlenses 74*b* are each positioned between adjacent ones of the microlenses 74*a*. In FIG. 7, the microlenses 74*b* are shifted in the Z direction by a distance corresponding to one-half of the length of the intervals between the microlenses 74*a*. The amount of shift in the Z direction is one-half of the length of the intervals, and thus the intervals between the microlenses 74*a* and 74*b* are further reduced.

Although the microlens array 74 according to the second exemplary embodiment has the two-row arrangement, the number of rows may be more than two, in which case a staggered arrangement may be employed.

A light-blocking wall 75 is structured such that light-transmitting portions 75*a* and light-blocking portions 75*b* are continuously arranged in an alternating manner in the Z direction, and one microlens 74*a* and one microlens 74*b* are disposed between adjacent ones of the light-blocking portions 75*b*.

Due to the arrangement of the microlenses 74*a* and 74*b*, there may be a case in which only one of the microlenses 74*a* and 74*b* is disposed between the adjacent light-blocking portions 75*b* at each end in the Z direction.

As illustrated in FIG. 7, also in the second exemplary embodiment, similar to the first exemplary embodiment, there are a light-blocking direction in which light is blocked by the light-blocking portions 75*b*, and a light-unblocking direction in which light is not blocked.

In the second exemplary embodiment, the light-blocking direction is the Z direction as in the first exemplary embodiment, but the light-unblocking direction is an X3 direction that is oblique to the Z direction unlike the first exemplary embodiment in which the light-unblocking direction is the X direction (see FIG. 5) that is substantially orthogonal to the Z direction.

The X3 direction is determined by the amount of shift in the Z direction between the row of the microlenses 74*a* and the row of the microlenses 74*b*. In the second exemplary embodiment, since the amount of shift in the Z direction is one-half of the length of the intervals, the X3 direction is a direction that crosses the Z direction at an angle of 45 degrees. Accordingly, the light-blocking portions 75*b* have surfaces P extending in a direction crossing the Z direction at an angle of 45 degrees.

The position of each light-blocking portion 75*b* on a first side surface 751 at one side X1 in the X3 direction and the position of the light-blocking portion 75*b* on a second side surface 752 at the other side X2 differ from each other in the Z direction.

In the second exemplary embodiment, the Z direction is an example of a direction in which the light-transmitting portions and the light-blocking portions are continuously arranged in the alternating manner, and is also an example of a light-blocking direction. The X3 direction is an example of a light-unblocking direction. The surfaces P are examples of extending surfaces.

Figure 8:
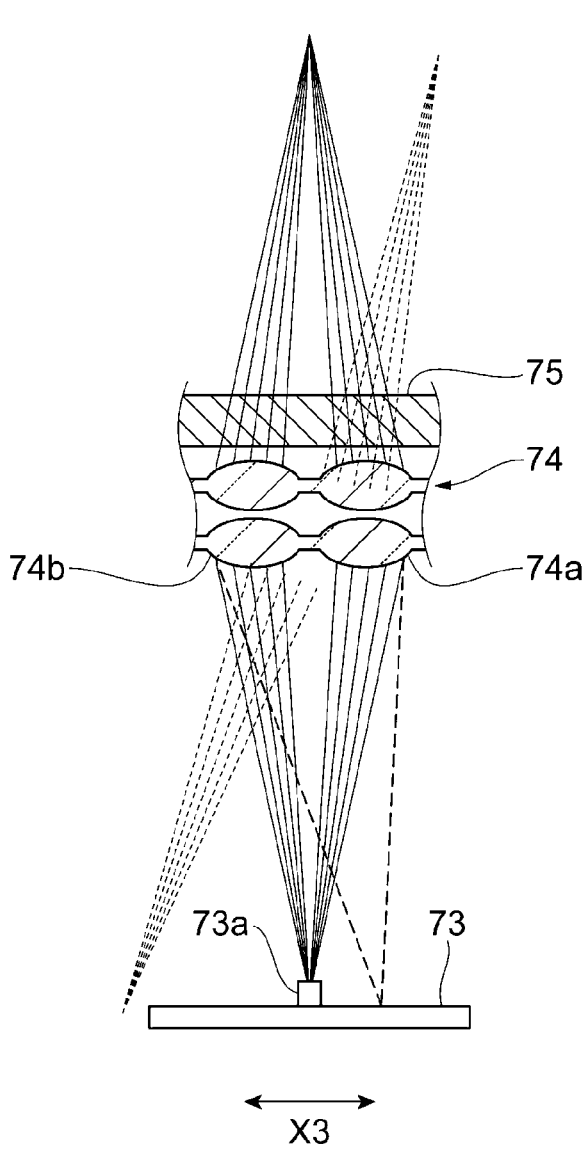
FIG. 8 illustrates blockage of light for the microlens array having a two-row arrangement according to the second exemplary embodiment.

FIG. 8 illustrates blockage of light for the microlens array 74 having the two-row arrangement according to the second exemplary embodiment.

Referring to FIG. 8, light shown by the solid lines is light that is reflected by the document, focused by the microlens array 74 onto the light-receiving elements 73a on the light-receiving substrate 73, and received by the light-receiving elements 73a. Light (shown by dashed lines) other than the light reflected by the document is not focused on the light-receiving elements 73a.

Although the light-blocking wall 75 does not block light in the X3 direction, the unblocked light shown by the dashed lines does not easily reach the light-receiving elements 73a on the light-receiving substrate 73, as illustrated in FIG. 8, and is unlikely to affect an image formed by the light reflected by the document. Therefore, the light-blocking wall 75 is only required to block light in the Z direction (see FIG. 7), and is not required to block light in the X3 direction. Thus, a light-blocking wall is provided such that the light-blocking direction is a direction in which the light-receiving elements are arranged and that the light-unblocking direction is a direction in which the light-receiving elements are not arranged.

Figure 9B:
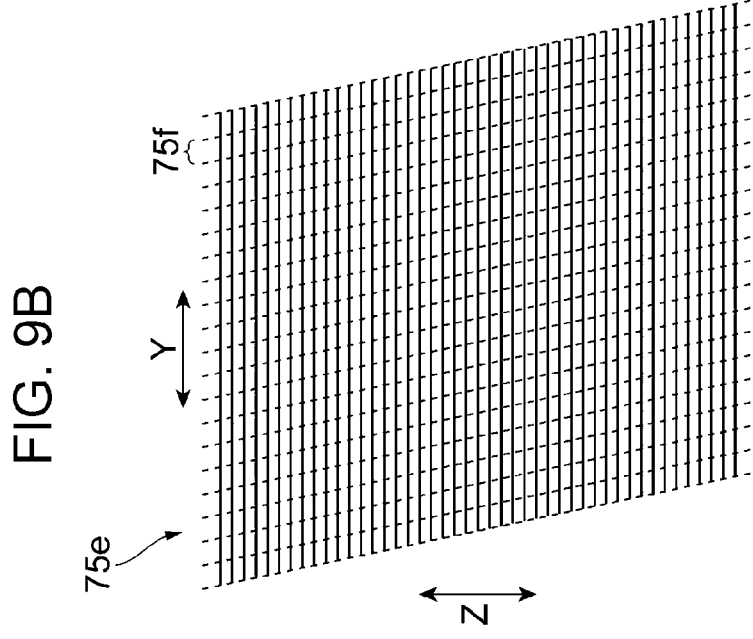
FIGS. 9A and 9B illustrate other sequential steps for manufacturing the light-blocking wall according to the second exemplary embodiment.
Figure 9A:
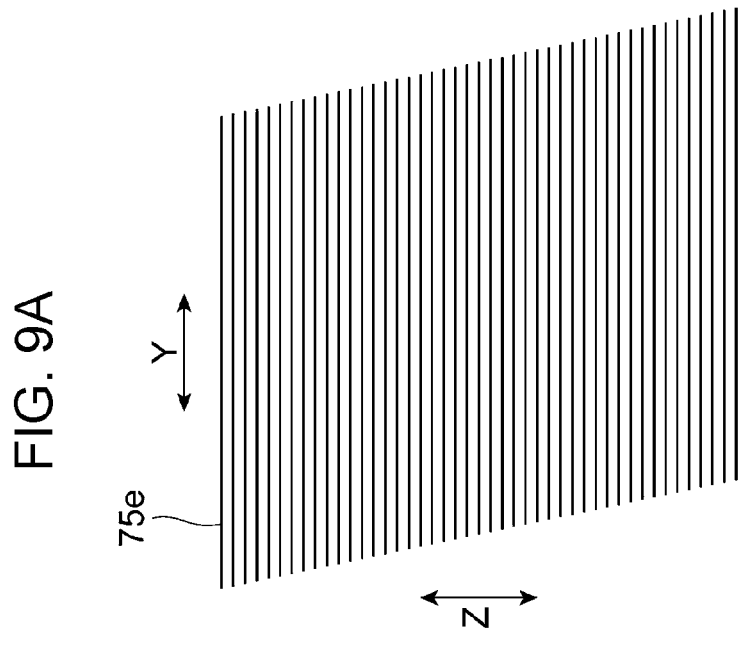

FIGS. 9A and 9B illustrate other sequential steps for manufacturing the light-blocking wall 75 according to the second exemplary embodiment. FIGS. 9A and 9B correspond FIGS. 6A and 6B, respectively.

A block member 75e including layers stacked in an oblique direction that crosses the Z direction, as illustrated in FIG. 9A, is cut along cutting plane lines (shown by dashed lines) that extend in the oblique direction. In this case, the number of multilayer members 75f (see FIG. 6C) produced from a single block member 75e is increased.

Third Exemplary Embodiment

Figure 10A:
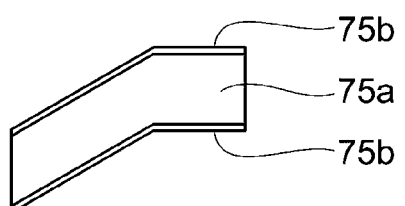
Figure 10B:
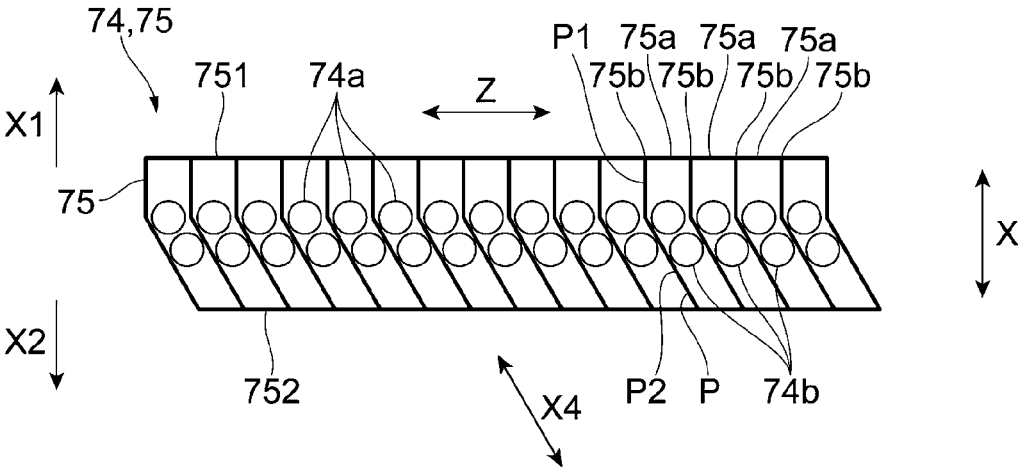

FIGS. 10A and 10B illustrate a light-blocking wall 75 according to a third exemplary embodiment, wherein FIG. 10A illustrates the shape of a light-transmitting portion 75a and light-blocking portions 75b of the light-blocking wall 75 and FIG. 10B illustrates the relative positional relationship between the light-blocking wall 75 and a microlens array 74. FIG. 10B corresponds to FIG. 7 illustrating the second exemplary embodiment.

FIG. 10A illustrates a polygonal prism as an example of a smallest unit of the light-blocking wall 75 including one light-transmitting portion 75a and two light-blocking portions 75b between which the light-transmitting portion 75a is disposed. More specifically, the light-transmitting portion 75a and the light-blocking portions 75b have a shape including two straight parts that continuously intersect at an obtuse angle, in other words, a shape that is bent at an intermediate position.

As illustrated in FIG. 10B, similarly to the second exemplary embodiment, the microlens array 74 has a two-row arrangement including microlenses 74a and 74b.

The light-blocking wall 75 is structured such that polygonal prisms having the shape illustrated in FIG. 10A are continuously arranged in the direction of the rows of the microlenses 74a and 74b, that is, in the Z direction.

In the third exemplary embodiment, light is blocked by the light-blocking portions 75b in the Z direction, and is not blocked in the X direction and an X4 direction that cross the Z direction. More specifically, light is not blocked in the X direction on a first side surface 751, and is not blocked in the X4 direction on a second side surface 752.

The light-blocking portions 75b according to the third exemplary embodiment have surfaces P including surfaces P1 extending in a direction substantially orthogonal to the Z direction as in the first exemplary embodiment and surfaces P2 extending in a direction crossing the Z direction at an angle of 45 degrees as in the second exemplary embodiment.

The surfaces P1 and P2 are portions of surfaces of the light-blocking portions 75b that define the boundaries between the light-transmitting portions 75a that are adjacent to each other. The angle at which the surfaces P1 cross the first side surface 751 and the angle at which the surfaces P2 cross the second side surface 752 differ from each other.

The crossing angle at which the surfaces P1 cross the Z direction is not determined by the relative positional relationship between the microlenses 74a and 74b of the microlens array 74, and the crossing angle at which the surfaces P2 cross the Z direction is determined by the relative positional relationship between the microlenses 74a and 74b of the microlens array 74.

In the third exemplary embodiment, the X direction in which light is not blocked is at different positions in the Z direction between one side X1 and the other side X2 in the X direction.

In the third exemplary embodiment, the Z direction is an example of a direction in which the light-transmitting portions and the light-blocking portions are continuously arranged in the alternating manner, and is also an example of a light-blocking direction. In addition, the X direction and the X4 direction are examples of a light-unblocking direction. The surfaces P1 are examples of second surfaces, and the surfaces P2 are examples of first surfaces.

Fourth Exemplary Embodiment

Figure 11A:
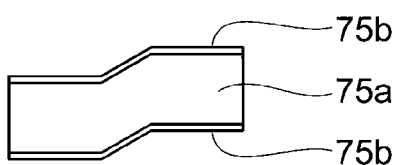
Figure 11B:
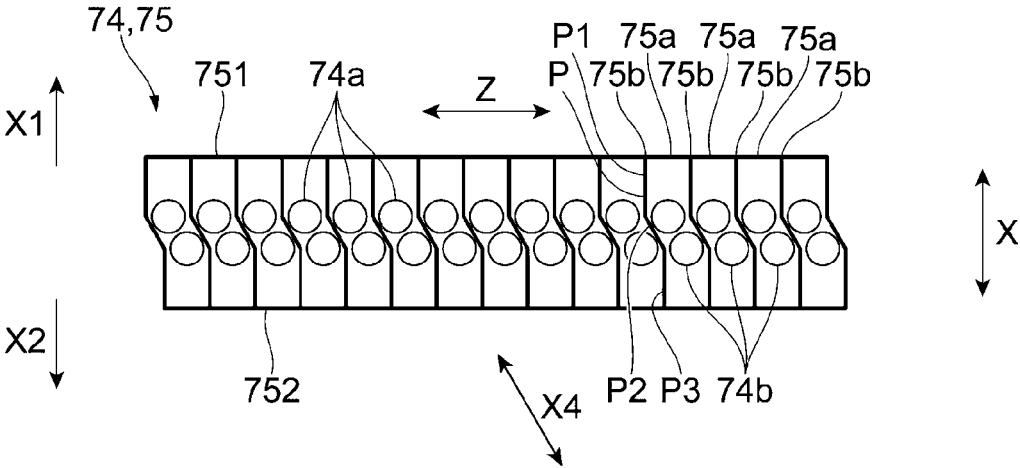

FIGS. 11A and 11B illustrate a light-blocking wall 75 according to a fourth exemplary embodiment, wherein FIG. 11A illustrates the shape of a light-transmitting portion 75a and light-blocking portions 75b of the light-blocking wall 75 and FIG. 11B illustrates the relative positional relationship between the light-blocking wall 75 and a microlens array 74. FIGS. 11A and 11B respectively correspond to FIGS. 10A and 10B described above.

FIG. 11A illustrates a polygonal prism as an example of a smallest unit of the light-blocking wall 75 including one light-transmitting portion 75a and two light-blocking portions 75b between which the light-transmitting portion 75a is disposed. More specifically, the light-transmitting portion 75a and the light-blocking portions 75b are formed in a shape having two bends in which two straight parts that are shifted from each other in the thickness direction are connected to each other.

As illustrated in FIG. 11B, in the fourth exemplary embodiment, light is blocked by the light-blocking portions 75b in the Z direction, and is not blocked in the X direction that crosses the Z direction. The X direction is substantially orthogonal to the Z direction, but has a shape with having bends.

In the fourth exemplary embodiment, the light-blocking portions 75b have surfaces P including surfaces P1 and P2 similar to those in the third exemplary embodiment and surfaces P3 extending continuously from the surfaces P2 to the second side surface 752. Thus, the surfaces P include the surfaces P1, P2, and P3.

The surfaces P3 extend in a direction substantially orthogonal to the Z direction similarly to the surfaces P1, and the surfaces P2 extend in a direction oblique to the Z direction. Therefore, the position of the light-unblocking direction in the Z direction differs between the first side surface 751 and the second side surface 752.

In the fourth exemplary embodiment, the Z direction is an example of a direction in which the light-transmitting portions and the light-blocking portions are continuously arranged in the alternating manner, and is also an example of a light-blocking direction. In addition, the X direction is an example of a light-unblocking direction. The surfaces P1 and P3 are examples of second surfaces, and the surfaces P2 are examples of first surfaces.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
An optical device including:
a lens body including a plurality of lenses arranged such that optical axes of the plurality of lenses extend along each other; and
a light-blocking body disposed on a light incident side of the lens body and including light-transmitting portions that transmit light and light-blocking portions that block light, the light-transmitting portions and the light-blocking portions being continuously arranged in an alternating manner such that the light-transmitting portions are positioned at the plurality of lenses and that the light-blocking portions are positioned between the plurality of lenses.

(((2)))
The optical device according to (((1))),
wherein the light-blocking body has
a light-blocking direction that is a direction in which the light-transmitting portions and the light-blocking portions are continuously arranged in the alternating manner and in which the light-blocking portions block light from entering the plurality of lenses, and
a light-unblocking direction that is a direction that crosses the light-blocking direction and in which the light-blocking portions do not block light.

(((3)))
The optical device according to (((2))), wherein a position of the light-unblocking direction in the light-blocking direction is constant between one side and other side in the light-unblocking direction.

(((4)))
The optical device according to (((2))), wherein a position of the light-unblocking direction in the light-blocking direction differs between one side and other side in the light-unblocking direction.

(((5)))
The optical device according to (((1))), wherein the light-blocking portions of the light-blocking body include extending surfaces that extend in a direction crossing a direction in which the light-transmitting portions and the light-blocking portions are continuously arranged in the alternating manner.

(((6)))
The optical device according to (((5))),
wherein the extending surfaces include
first surfaces positioned at the plurality of lenses of the lens body, and
second surfaces that are at an angle with respect to the first surfaces.

(((7)))
An image reading device including:
an irradiation unit that irradiates a document with light;
a lens body including a plurality of lenses arranged such that optical axes of the plurality of lenses extend along each other, the plurality of lenses transmitting light reflected by the document;
a light-blocking body disposed on a light incident side of the lens body and including light-transmitting portions that transmit light and light-blocking portions that block light, the light-transmitting portions and the light-blocking portions being continuously arranged in an alternating manner such that the light-transmitting portions are positioned at the plurality of lenses and that the light-blocking portions are positioned between the plurality of lenses; and
a light-receiving unit that receives light from the plurality of lenses.

What is claimed is:
1. An optical device comprising:
a lens body including a plurality of lenses arranged such that optical axes of the plurality of lenses extend along each other; and
a light-blocking body disposed on a light incident side of the lens body and including light-transmitting portions that transmit light and light-blocking portions that block light, the light-transmitting portions and the light-blocking portions being continuously arranged in an alternating manner such that the light-transmitting portions are positioned at the plurality of lenses and that the light-blocking portions are positioned between the plurality of lenses,
wherein the light-blocking body has:
a light-blocking direction that is a direction in which the light-transmitting portions and the light-blocking portions are continuously arranged in the alternating manner and in which the light-blocking portions block light from entering the plurality of lenses; and
a light-unblocking direction that is a direction that crosses the light-blocking direction and in which the light-blocking portions do not block light.
2. The optical device according to claim 1, wherein a position of the light-unblocking direction in the light-blocking direction is constant between one side and other side in the light-unblocking direction.
3. The optical device according to claim 1, wherein a position of the light-unblocking direction in the light-blocking direction differs between one side and other side in the light-unblocking direction.
4. The optical device according to claim 1, wherein the light-blocking portions of the light-blocking body include extending surfaces that extend in a direction crossing a direction in which the light-transmitting portions and the light-blocking portions are continuously arranged in the alternating manner.

5. The optical device according to claim 4,
wherein the extending surfaces include:
   first surfaces positioned at the plurality of lenses of the
      lens body; and
   second surfaces that are at an angle with respect to the
first surfaces.
6. An image reading device comprising:
an irradiation unit that irradiates a document with light;
a lens body including a plurality of lenses arranged such
   that optical axes of the plurality of lenses extend along
each other, the plurality of lenses transmitting light
   reflected by the document;
a light-blocking body disposed on a light incident side of
   the lens body and including light-transmitting portions
   that transmit light and light-blocking portions that
block light, the light-transmitting portions and the
   light-blocking portions being continuously arranged in
   an alternating manner such that the light-transmitting
   portions are positioned at the plurality of lenses and
   that the light-blocking portions are positioned between
the plurality of lenses, wherein the light-blocking body
   has:
   a light-blocking direction that is a direction in which
      the light-transmitting portions and the light-blocking
      portions are continuously arranged in the alternating
manner and in which the light-blocking portions
      block light from entering the plurality of lenses; and
   a light-unblocking direction that is a direction that
      crosses the light-blocking direction and in which the
      light-blocking portions do not block light; and
a light-receiving unit that receives light from the plurality
   of lenses.

* * * * *